United States Patent [19]
Kraty

[11] 3,743,844
[45] July 3, 1973

[54] RADIATION-SENSITIVE SCANNING CAMERA

[75] Inventor: Nigel P. Kraty, Maidenhead, England

[73] Assignee: Wilkinson Sword Limited, London, England

[22] Filed: Aug. 11, 1971

[21] Appl. No.: 170,821

[52] U.S. Cl. ........................................ 250/334
[51] Int. Cl. ..................... G01j 1/02, G01d 5/36
[58] Field of Search ............... 250/83.3 H, 83.3 HP, 250/233

[56] References Cited
UNITED STATES PATENTS

| | | | |
|---|---|---|---|
| 2,838,678 | 6/1958 | Beese | 250/83.3 HP |
| 2,898,801 | 8/1959 | Rockafellow | 250/233 X |
| 2,949,536 | 8/1960 | Langton | 250/83.3 H X |
| 3,003,064 | 10/1961 | Astheimer | 250/233 X |
| 3,072,740 | 1/1963 | Astheimer | 250/83.3 H X |
| 3,139,529 | 6/1964 | Stauffer | 250/233 X |

Primary Examiner—Archie R. Borchelt
Attorney—Jarrett Ross Clark, Gordon R. Coons et al.

[57] ABSTRACT

An infra-red camera is disclosed having a cylindrical housing with a window in one wall thereof across which, in a direction normal to the cylindrical axis of the housing, a slit extends. A drum is rotatably mounted within the housing and has a series of axially directed slits in its curved wall which successively pass across the fixed slit in the housing wall, so that the pinhole formed at the intersection of each drum slit with the housing slit performs a line scan of the camera's field of view. In a modification, the fixed slit is removed, and there are two rotatable drums mounted within the housing, one drum having inclined slits in its wall. The drums rotate at different speeds so that the pinhole formed by the intersection of each slit in one drum with each slit in the other drum performs a frame scan of the field of view.

16 Claims, 9 Drawing Figures

Patented July 3, 1973

INVENTOR
NIGEL P. KRATY
BY
Wolfe, Hubbard, Leydig, Voit & Osann, Ltd.
ATTORNEY

INVENTOR
NIGEL P. KRATY

RADIATION-SENSITIVE SCANNING CAMERA

BACKGROUND OF THE INVENTION

This invention relates to image-converting apparatus for scanning a field of view so as to be able to respond to the radiation emitted by each portion thereof.

The invention is particularly but not exclusively useful for providing an infra-red picture of an area to indicate the relative temperatures of different parts thereof.

BRIEF SUMMARY OF THE INVENTION

According to the invention, there is provided image-converting apparatus, comprising means defining a predetermined area on to which radiation from a field of view is directed, means defining a pinhole within the said area, means operative to move the pinhole along a predetermined path within the said area whereby to scan the said area and radiation detection means mounted to respond to radiation received from the field of view via the pinhole.

According to the invention, there is also provided image-converting apparatus, comprising means defining a field of view of the apparatus and directing radiation therefrom on to a predetermined area, first and second radiation-transmitting elongate aperture means arranged transverse to each other in respective members which are movable along separate paths whereby radiation from the field of view can pass through the pinhole formed at the optical intersection of the aperture means, the members being positioned and constrained for relative movement such that the intersection moves along the longitudinal axis of at least one aperture means so as to scan the said area.

DESCRIPTION OF THE DRAWINGS

Cameras embodying the invention will now be described, by way of example only, with reference to the accompanying drawings in which.

DESCRIPTION OF PREFERRED EMBODIMENTS

Figure 1:
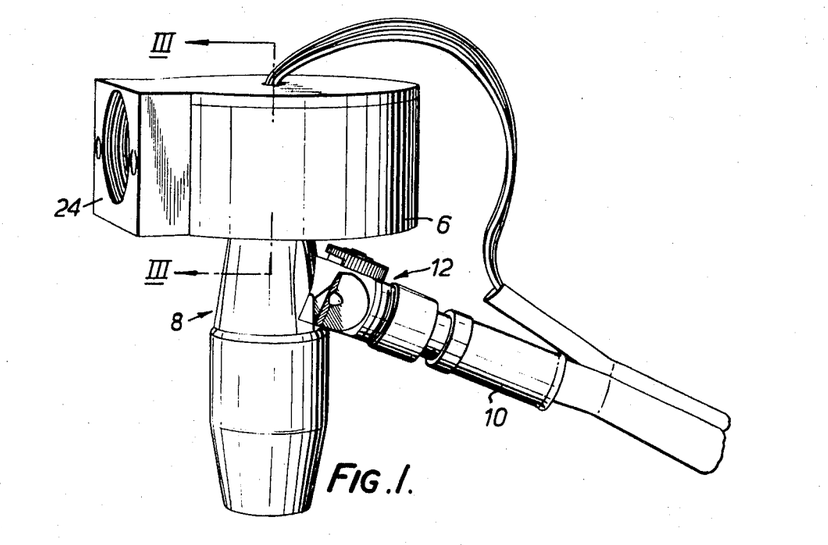
FIG. 1 is a perspective view of one form of the camera.
Figure 2:
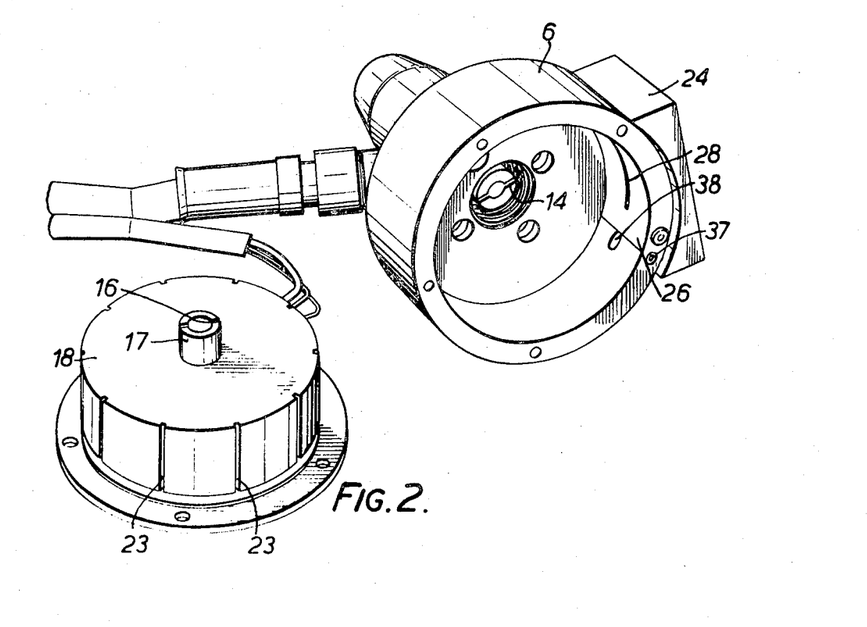
FIG. 2 is a perspective view of the camera of FIG. 1 in partially dismantled form.
Figure 3:
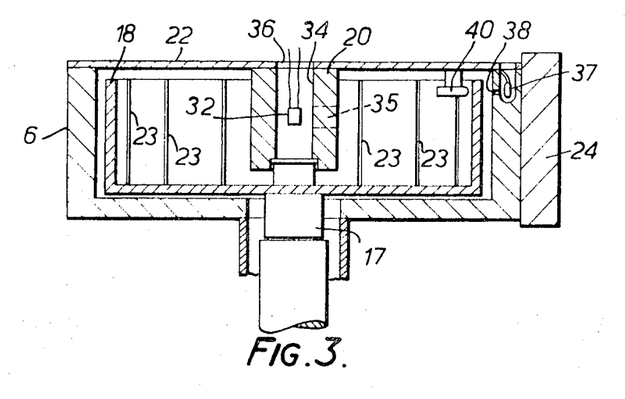
FIG. 3 is a diagrammatic section through part of the camera of FIGS. 1 and 2, taken on the line III—III of FIG. 1.

The camera illustrated in FIGS. 1 to 3 comprises a housing 6 having a hollow tubular extension 8 in which is mounted a compressed-air driven motor, the compressed air being supplied through a pipe 10 and a control valve 12. The shaft of the air motor is provided with a pin 14 which couples to a slot 16 formed in the end of an extension 17 rigid with a drum 18.

The drum 18 is in the form of a hollow cylinder, open at one end, and is rotatably supported, on its inside, in a bearing carried by a downwardly projecting central post 20 (FIG. 3) rigid with a top plate 22, the latter being attached to the housing 6 by means of circumferentially spaced screws. The curved wall of the drum 18 is provided with a plurality of axially directed through slots 23 equally spaced around the wall.

A circular hole is bored through a portion of the circular wall of the housing 6, and an apertured surround 24 containing a lens (not shown) for receiving radiation from the scene being viewed is attached to the outside of the housing wall at this point. Attached to the inside of the wall at this point is a thin opaque strip 26 (see FIG. 2) in which is formed a thin slit 28 extending over the diameter of the hole in the housing wall. The lens in the surround 24 focusses the radiation onto the surface of the drum 18.

A radiation-responsive detector 32, of a type which is arranged to vary an electrical parameter in a circuit in dependence on the radiation received, is mounted in a hollow bore 34 through the post 20 and aligned with a radially extending hole 35 (shown dotted in FIG. 3) through the post wall which meets the bore 34. The hole 35 contains a lens or polished conical guide (not shown) and is aligned with the circular openings through the wall of the housing 6 and the surround 24. Electrical connections to the detector 32 are brought out through the hollow bore 34 and a hole 36 in the top plate 22. The detector 32, which may, for example, operate on the photovoltaic or the photo-resistive principle, is electrically connected by suitable circuitry, such as will be described in detail below with reference to FIGS. 5 and 6, to control the intensity of the electron beam in a cathode ray tube.

A separate, light-sensitive, photocell 37 (see FIG. 2) is housed in an axially extending blind bore in the circular wall of the housing 6 and its sensitive area is aligned with a radially extending hole 38 which extends through a portion of the wall of the housing 6 to meet the blind bore. The hole 38 is positioned adjacent one end of the slit 28 in the strip 26 and is in alignment with a lamp 40 which is supported on the top plate 22 of the housing so as to be inside the circular wall of the drum 18. Electrical connections (not shown) to the photocell 37 and the lamp 40 are brought out through the hole 36 (FIG. 3) in the top plate 22 and are connected to control the time base of the cathode ray tube by suitable circuitry (not shown).

In operation, the camera is positioned so that the apertured surround 24 is facing the scene to be viewed. The drum 18 is then rotated by means of the air motor in the extension 8 of the housing at a speed controlled by the valve 12. The axially arranged slits 23 in the drum 18 thus pass sequentially across the slit 28 from one end of the latter to the other. A small pin-hole aperture is thus revealed at the intersection of the slit 28 with each slit 23, and this aperture moves across the field of view from one end of the slit 28 to the other. The radiation focussed on to the drum surface by the lens in the surround 24 passes through this pin-hole aperture and thence is focussed by the lens or guide in the hole 35 and falls on the centrally mounted detector 32. The detector output thus varies according to the intensity of the radiation falling thereon and correspondingly modulates the intensity of the electron beam in the cathode ray tube to produce on the screen thereof a radiation "picture" of the scene being viewed. In effect, the camera performs a line-scan of the scene being viewed. The separate photocell 37 produces a signal at the instant when each slit 23 begins its traverse across the slit 28, and this signal can be used to synchronize the time base of the cathode ray tube.

Figure 4:
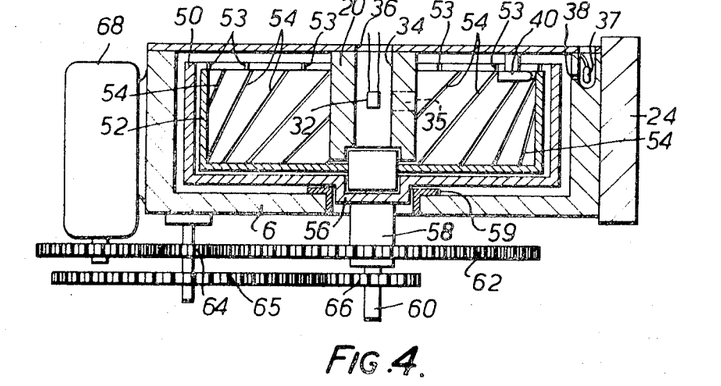
FIG. 4 is a diagrammatic cross section, corresponding to FIG. 3, of another of the cameras embodying the invention.

In the modified form of the camera, as shown in FIG. 4 (in which parts corresponding to parts in FIGS. 1 to 3 are similarly referenced), the drum 18 of the form of camera described with reference to FIGS. 1 to 3 is replaced by two drums 50 and 52 which are mounted concentrically within the housing 6. Both of these drums are the same general shape as drum 18, and the outer drum 50 has axially arranged slits 53 corresponding to the slits 23 (see FIG. 3) of the drum 18. The inner drum 52, however, is formed with a plurality of slits 54 in its circular wall which are arranged at an angle of about 45° to the drum axis. The outer drum 50 is formed with a collar 56 from which extends an axial hollow tube 58. The outer periphery of the collar 56 is rotatably supported in a bearing bush 59 positioned in a hole through the base of the housing 6. The inner periphery of the collar 56 rotatably supports the inner drum 52 to which is rigidly attached a shaft 60 extending, with clearance, through the tube 58. The inside of the drum 52 is located in a bearing supported in the post 20.

The tube 58 and the shaft 60 are geared together by means of gears 62, 64, 65, 66, so that the outer drum 50 rotates at a fraction one-fiftieth, for example) of the speed of the inner drum 52, and the drums are connected to be driven by a motor 68 which may, for example, be an electrical synchronous motor.

The camera illustrated in FIG. 4 does not have the strip 26 and the slit 28 extending across the circular opening in the wall of the housing 6.

As before, the camera has the lens in the apertured surround 24 and the lens or polished guide in the hole 35.

As in the case of the camera illustrated in FIGS. 1 to 3, the detector 32 of the camera of FIG. 4 is electrically connected by suitable circuitry, such as will be described with reference to FIGS. 5 and 6, to control the intensity of the electron beam of a cathode ray tube, and the photocell 37 is connected to control the time base of the cathode ray tube.

In operation, the drums 50 and 52 are rotated by the motor 68. At the intersection of each slit 54 with a respective slit 53, a pin-hole aperture is formed on to which radiation from the scene being viewed is focussed by the lens in the surround 24 when the aperture is positioned in alignment with the circular hole through the wall of the housing 6 and the surround 24. This radiation passes through the aperture and is focussed by the lens or guide in the hole 35 on to the detector 32. As the inner drum moves relative to the outer drum (so that the sloping slit 54 is moving relative to the axial slit 53), the pin-hole aperture moves in a generally axial direction over the field of view. It will be assumed that the direction of rotation of drum 52 is such that the aperture moves downwards as viewed in FIG. 4. During this downward axial movement, the aperture also moves very slightly in a perpendicular direction due to the slow rotation of the outer drum 50. When the aperture has reached the extreme lower limit of its axial movement, the next sloping slit 54 begins to traverse across the field of view and intersects with the axial slit 53, at the upper axial end thereof, to form a further pin-hole aperture which now moves axially downwards over the field of view as before. This process is continually repeated so that the effect is of a pin-hole aperture forming a series of substantially parallel line-scans over the field of view. A frame-scan is completed when the axial slit 53 has finally moved completely across the field of view, the next frame-scan being initiated by the arrival of the next axial slit 53.

During this scanning process, the detector 32 modulates the intensity of the electron beam in the cathode ray tube in accordance with the intensity of the radiation passing through the pin-hole aperture, and the screen thus carries a video display of the field scanned by the camera. The photocell 37 is so positioned as to produce its signal at the beginning of each frame-scan, that is, as each axial slit 53 begins its traverse across the field of view, the intersecting sloping slit 54 being disposed, at this time, in such a position that the pin-hole aperture formed is at the extreme upper end of the axial slit 53. This signal from the photocell can thus be used to synchronize the time base of the cathode ray tube with each frame-scan of the camera. Instead of this arrangement, a lamp can be mounted between the drums 50, 52 to co-operate with two photocells respectively mounted outside the outer drum 50 and inside the inner drum 53 through the slits therein; the photocells are arranged to synchronize the cathode ray tube with each line scan and frame scan of the camera.

The numbers of lines per frame, and the number of frames per second of the camera can be adjusted by altering the relative speeds of the inner and outer drums 50 and 52 and the relative sizes and positions of the slits.

If the gearing between drums 50 and 52 is such that the speed of the inner drum is not an integral multiple of the speed of the outer drum, then an interlaced scan can be produced. For example, if the outer drum 50 rotates at 1/25½th of the speed of the inner drum 52 (instead of at one-fiftieth specified in the example given above), the lines of each frame would be interlaced with the lines of the preceding frame giving a total of 51 lines for each two frames.

The type of detector 32 used in either of the forms of camera described depends on the wavelengths of the radiation to be detected. The detector may be required to respond to infra-red radiation, in which case an indium arsenide coil may be used, for example; in this case, the camera may incorporate cooling means of suitable type. In another example, the detector may be a cell arranged to respond to ultra-violet radiation, and similarly for any other wavelength a suitable detector can be selected.

Figure 5:
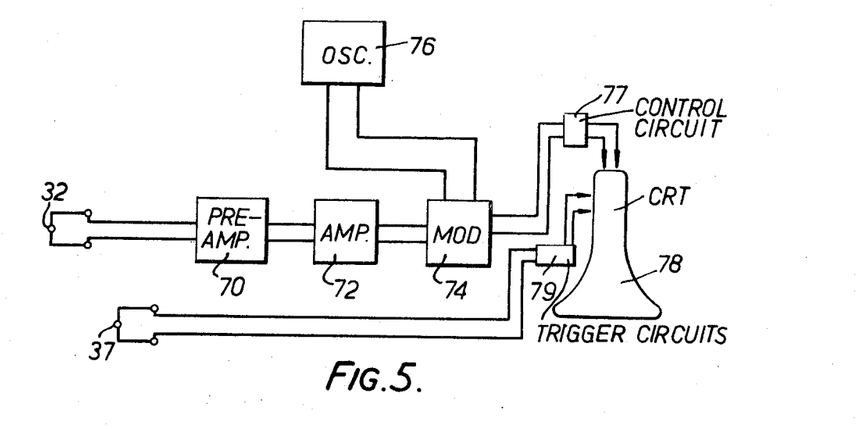
FIGS. 5 and 6 are block diagrams of different electrical circuits for use with the cameras of the preceding Figures.

FIG. 5 shows one form of circuit which can be used with either of the forms of camera described. In this circuit, the output from the detector 32 is amplified in a pre-amplifier 70 and an amplifier 72 and fed to a modulator 74 where it is used to modulate the output of a high frequency oscillator 76. A modulated output from modulator 73 is then supplied to the Z control circuit 77 of the cathode ray tube 78 to control the intensity of the electron beam therein. The output signal from the photocell 37 is connected to the X and Y trigger circuits 79 of the cathode ray tube to synchronize the time base thereof.

Figure 6:
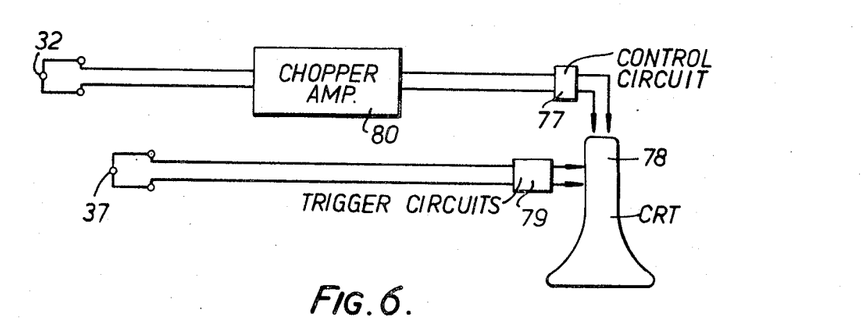

FIG. 6 shows another circuit which can be used with either of the forms of camera described above, and comprises a high frequency chopper amplifier 80 (operating in the megacycle range, for example) which directly chops the output from the detector 32. The amplified and chopped signal is then fed to the Z control circuits 77 of the cathode ray tube 78 and used to control the intensity of the electron beam therein. As before, the signal from the photocell 37 controls the X and Y trigger circuits from the cathode ray tube.

Instead of providing a chopper amplifier 80 to chop the output from the detector 32, the detector can be caused to produce a chopped output directly by arranging for the slits in one or both of the two drums to be in the form of rows of perforations. The term "elongate aperture means" is used herein to include both slits and rows of perforations as the context permits.

Instead of the circuits of FIGS. 5 and 6, a video amplifier can be used to amplify the output of the detector 32 and to feed it to a television-type of cathode ray tube. The output from the photocell 37 (or from the two photocells suggested as a replacement therefore in the camera of FIG. 4) can, instead of being used to synchronize the time base of the tube, be used to generate a repeated ramp signal which drives the X and Y amplifiers of the tube.

Schmitt triggers or the like may be incorporated in the circuitry between the detector and the tube so as to provide that the display on the tube is only present when the radiation on the detector 32 lies between upper and lower limits.

If desired, the lens in surround 24 and the lens or guide in the hole 35 may be dispensed with so that the camera operates on the pin-hole principle. The absence of lenses, mirrors, and the like is particularly advantageous in cases where the camera is required to be sensitive to infra-red or ultra-violet radiation since special materials must be used for lenses and the like used with such radiations. Furthermore, pin-hole operation eliminates the need for focussing, provides a large depth of field and enables wide angle vision without major complications; however, it requires a sensitive detector or a high level of radiation.

The positions of the photocell 37 and the lamp 40 can be reversed.

In order to increase the path length between the aperture formed by the intersecting slits and the detector 32, so as to provide a better match between the size of the sensitive area of the detector and the image size produced by the aperture, the detector 32 may be mounted at the end of an axial extension of the housing 6, the radiation being directed on to the detector by means of a centrally positioned inclined mirror or other reflector.

Figure 7:
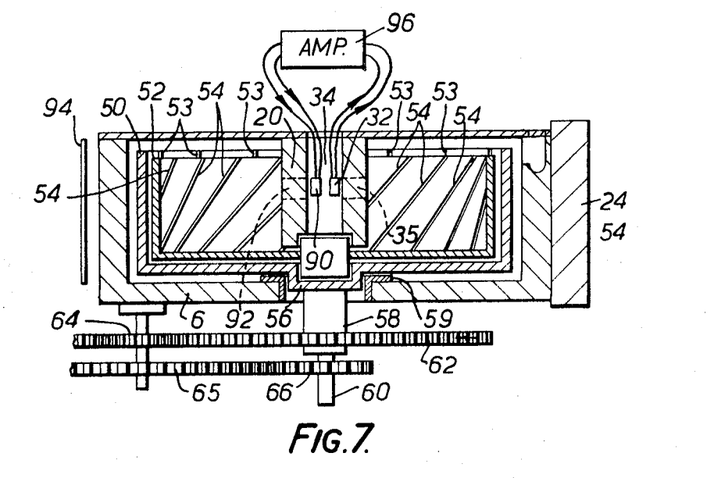
FIG. 7 is a diagrammatic cross section, corresponding to FIG. 4, of a further camera embodying the invention.

FIG. 7 shows modifications to the camera of FIG. 4 and enables the camera to provide a direct display, that is, it avoids the need for a cathode ray tube or the like. In FIG. 7, items corresponding to items in FIG. 4 are similarly referenced. In the camera of FIG. 7, the detector 32 is positioned slightly differently (slightly off axis) as compared with the camera of FIG. 4, and a light source capable of high frequency modulation, such as a gallium phosphide diode 90, is positioned in the bore 34 along with the detector 32. The diode 90 is positioned in alignment with a further radially extending hole 92 (shown dotted), and the latter is in alignment with an aperture (not visible in FIG. 7) which is positioned in the housing 6 at a point therein diametrically opposite to the hole facing the surround 24 and is in alignment with a ground glass screen or the like, 94.

The output from the detector 32 is connected to an amplifier 96 whose output feeds the diode 90.

FIG. 7 does not show the driving motor 68 for driving the gears 62 to 66, but this would be positioned generally similarly to the arrangement of FIG. 4, but at a different peripheral position relative to the housing 6.

In operation, the motor 68 rotates the drums 50 and 52 in the manner explained in connection with FIG. 4, and the slits 53 and 54 provide a frame scan of the scene being viewed and the radiation therefrom is projected on to the detector 32 in the manner previously described. The resultant electrical output of the detector 32 is amplified in the amplifier 96 and correspondingly energizes the photodiode 90. The light produced by the diode 90 is then projected on to the ground glass screen 94 through the intersecting slits 53 and 54: the latter cause the light spot on the ground screen to carry out a frame scan corresponding to the frame scan of the scene being viewed. The ground glass screen 94 therefore carries an optical image of the scene being viewed, the image of course being in terms of the particular type of radiation to which the detector 32 responds. Thus, if the detector 32 responds to infra-red radiation, then the image on the screen 94 will be a thermogram of the scene being viewed. If the light source 90 were such as to be able to produce three, say, differently colored light beams, according to the intensity of the signal from the amplifier 96, then the image projected on to the screen 94 would be a colored thermogram with different colors representing different levels of radiation.

Figure 8:
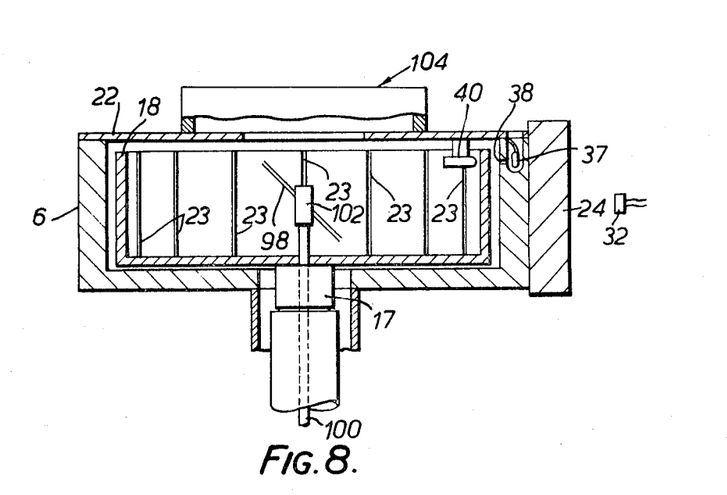
FIG. 8 is a diagrammatic cross-section, corresponding to FIG. 3, of yet another camera embodying the invention.

FIG. 8 shows a modified form of the camera of FIGS. 1 to 3, and items in FIG. 8 corresponding to items in FIGS. 1 to 3 are similarly referenced. In the camera of FIG. 8, the detector 32 is placed outside the housing 6 and is aligned with the aperture in the surround 24. A mirror 98 is mounted by suitable means (omitted for clarity) so as to be suspended within the drum 19 and capable of oscillating or nutating to and fro in the direction of the arrow, (and not affected by the rotation of the drum). This oscillating movement is caused by a drive shaft 100 which is drivingly connected to the mirror by means of a gear box 102. A suitable objective lens system 104, shown diagrammatically only, is arranged to project light from the scene being viewed on to the mirror 98.

In operation, each slit 23 in the drum 18 is carried past the fixed slit 28 (FIG. 2) as the drum 18 rotates, and the radiation emitted from the aperture formed where the slit 23 intersects with the slit 28 is projected, by means of a suitable lens system in the surround 24, on to the detector 32. As the mirror 98 nutates, there is a continual change in the particular point of the viewed scene which is projected on to the detector 32. Therefore, the rotation of the drum 18 and the nutation of mirror 98 combine to provide a frame scan of the scene. The detector 32 can be connected to one of the circuits of FIGS. 5 and 6 to provide a cathode ray tube display.

The arrangement of FIG. 4 can be modified by placing a mirror within the inner drum 52. The mirror would be mounted in generally similar fashion to the mirror 98 of the arrangement of FIG. 8 except that it would be fixed in relation to the housing 6 and incapable of nutation. The detector 32 would be mounted externally of the camera in the manner of the camera of FIG. 8, and the fixed mirror would reflect the radiation from the scene being viewed onto the detector 32. The rotating drums 50 and 52 would provide a frame scan of the scene in the manner explained in connection with FIG. 4. Cameras having the detector 32 externally of the housing and the mirror (whether fixed or rotatable) inside are advantageous in that a larger collecting optical system can more easily be embodied in the overall design. Cooling of the detector is also made easier.

Figure 9:
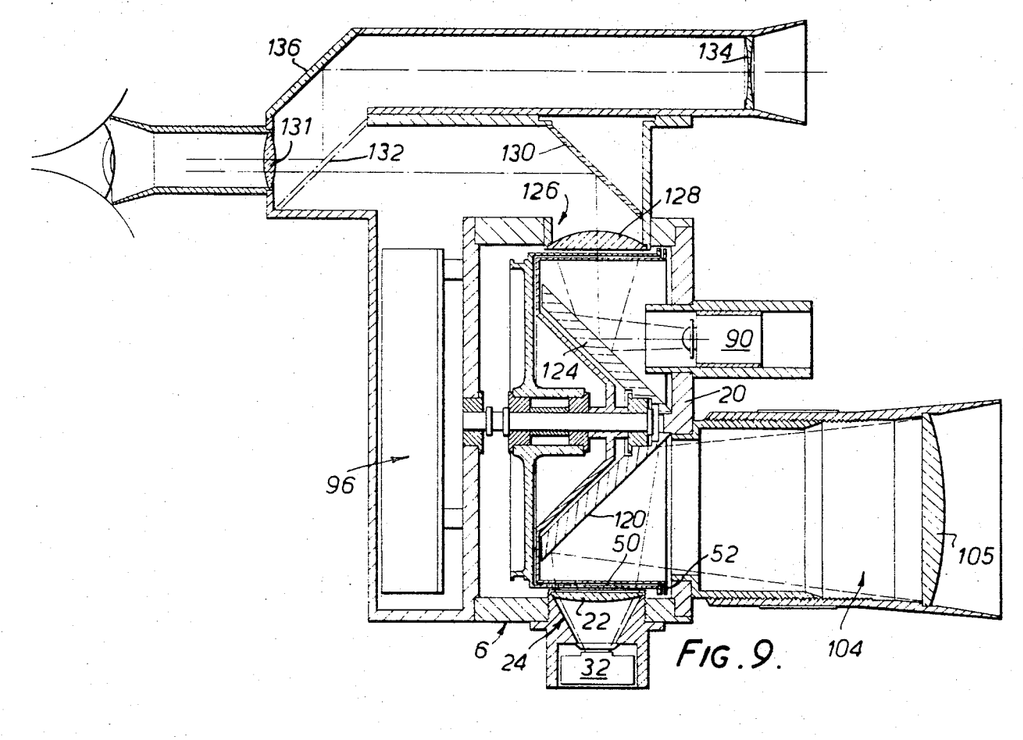
FIG. 9 is a diagrammatic cross-section of yet a further camera embodying the invention.

FIG. 9 shows such an arrangement which also combines some of the features of the camera of FIG. 7, and items in FIG. 9 corresponding to items in other Figures are similarly referenced. As shown in FIG. 9 the camera has the two concentric drums 50, 52 (the slits 53 and 54 having been omitted from the Figure for clarity). The radiation from the field of view is received by the lens system 104, incorporating an objective lens 105, and is reflected by a fixed mirror 120 towards the inner surface of the drum 52. After passing through the pinhole defined by the intersecting slits in the two drums, the radiation passes out through the window 24 which incorporates a field lens 122, and strikes the detector 32. The signal produced by the detector 32 is amplified in the amplifier 96 and controls the light output of a solid state lamp 90, such as a gallium phosphide cell. The electrical connections to and from the amplifier 96 have been omitted from the Figure for clarity. The lamp 90 is fixedly mounted on the housing 6 and its light output is reflected by a fixed mirror 124 on to the inner surface of the drum 52 at a point diametrically opposite the window 24. The light output passes out, via a pinhole defined by intersecting slits 53 and 54, through a window 126 incorporating a field lens 128 and is reflected by a mirror 130 to to an eyepiece lens 131 via a half-silvered mirror 132.

In addition, the camera incorporates an objective lens 134 which receives visible light from the scene being viewed by the camera and this in turn is passed to the eyepiece lens 131 via the half-silvered mirror 132 and a fully silvered mirror 136. The lenses 131 and 134 and the mirrors 130, 132 and 136 are suitably supported from the housing 6 of the camera. Thus, assuming the detector 32 is sensitive to infra-red radiation, the operator is presented, via the lens 131, with a display showing the scene viewed by the camera and on which there is superimposed an infra-red "picture" of the same scene. If the diode 90 is a gallium phosphide diode, it will produce a red-colored output in response to infra-red radiation picked up by the detector 32, and therefore, the "hot-spots" of the scene being viewed will appear colored red on the combined display presented to the operator via the lens 131. By this means, the resolution required of the camera is reduced. The use of the lens 126 is advantageous over the ground glass screen 94 shown in FIG. 7, since the latter requires a higher light intensity to produce an adequate picture.

The mechanism by which the drums 50 and 52 are driven in the camera of FIG. 9 is omitted for clarity, but would be generally the same as in the camera of FIG. 7.

We claim:

1. Image converting apparatus, comprising a base,
means defining a predetermined area fixed relative to the base and onto which radiation received from a field of view is directed,
a hollow cylindrical housing defining elongate aperture means in its curved wall
a hollow drum mounted within the housing so as to be rotatable about the cylindrical axis of the housing, and defining a second aperture extending through the wall of the drum which aperture repeatedly moves transverse to and forms an optical intersection with the said aperture means in the housing as the drum rotates, the said optical intersection lying in the said predetermined area to perform a line scan of the field of view, and
radiation detection means mounted to respond to radiation received from the field of view through the optical intersection.

2. Apparatus according to claim 1, in which the radiation detection means is mounted substantially centrally within the drum.

3. Apparatus according to claim 1, in which the radiation detection means is mounted externally of the drum, and including optical means mounted on the base so as to direct radiation from the field of view onto the inside wall of the drum and thence through the optical intersection of the two apertures and onto the radiation detection means.

4. Apparatus according to claim 3, in which the said optical means is operative to repeatedly move the radiation across the said predetermined area and in a direction perpendicular to the line of the said line scan, whereby the combined movement of the radiation and the said optical intersection provides a frame scan of the field of view.

5. Apparatus according to claim 4, in which the said optical means includes a mirror mounted on the said base so as to be notatable in a direction such as to move the radiation over the said predetermined area.

6. Image-converting apparatus, comprising
a base,
means defining a predetermined area fixed relative to the base and onto which radiation received from a field of view is directed,
a hollow cylindrical housing fixedly mounted on the said base and having a first window defining the said predetermined area and a second window defining an area spaced circumferentially around the housing from the said first window,
two hollow concentric drums mounted one within the other and both within the housing so as to be rotatable relative to each other and relative to the housing about the cylindrical axis of the housing,
one of the drums defining a plurality of similar, parallel, elongate aperture means in its wall and the other of the drums defining a plurality of similar, parallel, elongate means in its wall, each elongate aperture means in one of the drums being inclined to the elongate aperture means in the other of the drums at an angle less than 90° whereby as the drums rotate relative to each other and relative to the housing the pinhole formed at the optical intersection of one elongate aperture means in one of the drums and successive ones of the elongate aperture means in the other of the drums performs a frame scan of the said field of view as the elongate aperture means move across the said area, radiation detection means mounted to respond to radiation received from the field of view through the said optical intersection, radiation producing means mounted on the said base to project radiation through an optical intersection between other ones of the elongate aperture means respectively defined in the two drums when those other elongate aperture means move across the said second window, means connecting the said radiation detection means to control the intensity of the radiation produced by the radiation producing means in dependence on the intensity of the radiation received by the radiation detection means, and means mounted to receive the radiation from the radiation producing means and producing a visual display thereof.

7. Apparatus according to claim 1, in which the radiation detection means comprises a radiation responsive cell operative to produce an electrical output in dependence on the radiation received thereby, and including display means connected to receive the electrical output and operative to produce a visual display thereof.

8. Apparatus according to claim 6, in which the radiation detecting means is sensitive to radiation other than visual radiation whereby the said visual display produced is in terms of the non-visual radiation, and including an optical system fixedly mounted on the said base and operative to project a corresponding visual display, in terms of visible radiation, into superimposition on the said display in terms of the non-visual radiation.

9. Image-converting apparatus, comprising
a base, means defining a predetermined area fixed relative to the base and onto which radiation received from a field of view is directed, a hollow cylindrical housing fixedly mounted on the said base and having a window defining the said predetermined area, two hollow concentric drums mounted one within the other and both within the housing so as to be rotatable relative to each other and relative to the housing about the cylindrical axis of the housing, one of the drums defining a plurality of similar, parallel, elongate aperture means in its wall and the other of the drums defining a plurality of similar, parallel, elongate means in its wall, each elongate aperture means in one of the drums being inclined to the elongate aperture means in the other of the drums at an angle less than 90° whereby as the drums rotate relative to each other and relative to the housing the pinhole formed at the optical intersection of one elongate aperture means in one of the drums and successive ones of the elongate aperture means in the other of the drums performs a frame scan of the said field of view as the elongate aperture means move across the said area, radiation detection means fixedly mounted relative to the base and externally of the drums and housing, and mirror means mounted inside the drums to receive radiation directly from the field of view, and to direct radiation on to the radiation detection means through the said optical intersection.

10. Apparatus according to claim 9 and in combination with a cathode ray tube, in which the radiation detection means comprises a radiation responsive cell operative to produce an electrical output in dependence on the radiation received via the pinhole, means electrically interconnecting the radiation responsive cell and the cathode ray tube whereby the electron beam intensity of the cathode ray tube is controlled in dependence on the electrical output of the radiation responsive cell, and means mounted to respond to rotation of the drum and connected to control the time base of the cathode ray tube in dependence thereon.

11. Image-converting apparatus, comprising
a base, means fixedly mounted relative to the said base and defining first and second optical windows, first and second supports mounted on the base for movement relative to each other at a constrained relative speed and respectively carrying a plurality of radiation transmitting slits, means mounting the supports so that their slits lie in parallel paths which pass across the windows with the slits on one support being transversely aligned relative to those on the other so that the slits on one support make optical intersections with those on the other, whereby in response to the said relative movement of the supports the optical intersections move across the windows, radiation-responsive means fixedly mounted relative to the base to receive radiation passing through each said intersection as it moves across the first window and to produce a corresponding electrical output, radiation-producing means arranged to produce a radiation output in response to an electrical input and fixedly mounted relative to the base to project the said radiation output through each said intersection as it moves across the second optical window, and means connecting the said electrical output of the radiation-responsive means to be the said electrical input of the said radiation-responsive means, whereby the radiation output projected by the radiation-responsive means produces a display corresponding to the radiation sensed by the radiation responsive means.

12. Apparatus according to claim 11, in which the radiation reaching the radiation-responsive means passes through the said intersection and the first optical window in that order, and including optical means mounted on the said base for projecting the radiation onto the said intersection as it moves across the first optical window.

13. Apparatus according to claim 12, in which the said radiation output from the radiation-producing means passes through the said intersection and the second window in that order, and is directed from the radiation-producing means to the said intersection by the said optical means.

14. Apparatus according to claim 13, in which the optical means is a mirror having two mutually inclined portions, one to project the radiation on to the said intersection moving across the first optical window, and the other to project the radiation from the radiation-producing means onto the intersection moving across the second optical window.

15. Apparatus according to claim 11, in which the said first and second relatively movable supports comprise respective relatively rotatable hollow opaque-walled drums concentrically mounted one within the other on the said base, each drum having its said slits defined in its curved wall, the slits in one drum being inclined relative to those in the other, and means mechanically linking the two drums whereby their relative speeds of rotation are constrained such that the optical intersection between successive slits in the first drum and one of the slits in the second drum performs a frame scan of the first window at the same time as the optical intersection between successive slits in the first drum and another of the slits in the second drum performs a frame scan of the second window.

16. Apparatus according to claim 15, in which the said means defining the first and second optical windows comprises a cylindrical housing mounted on the base and concentric with and surrounding the drums and having apertures defining said windows.

* * * * *